United States Patent
Reome et al.

(10) Patent No.: US 10,074,191 B1
(45) Date of Patent: Sep. 11, 2018

(54) SYSTEM AND METHOD FOR DETERMINATION OF OBJECT VOLUME WITH MULTIPLE THREE-DIMENSIONAL SENSORS

(71) Applicant: Cognex Corporation, Natick, MA (US)

(72) Inventors: Matthew R. Reome, Framingham, MA (US); Mark D. Johnson, Ashland, MA (US); Mikhail Akopyan, Sudbury, MA (US)

(73) Assignee: COGNEX CORPORATION, Natick, MA (US)

( * ) Notice: Subject to any disclaimer, the term of this patent is extended or adjusted under 35 U.S.C. 154(b) by 0 days.

(21) Appl. No.: 15/193,665

(22) Filed: Jun. 27, 2016

Related U.S. Application Data (60) Provisional application No. 62/188,732, filed on Jul. 5, 2015.

(51) Int. Cl.
| | | |
|---|---|---|
| *G06K 9/32* | (2006.01) | |
| *G06T 7/00* | (2017.01) | |
| *G06T 7/60* | (2017.01) | |
| *G01B 11/25* | (2006.01) | |
| *G01S 17/89* | (2006.01) | |
| *G06T 7/62* | (2017.01) | |

(52) U.S. Cl.
CPC .......... *G06T 7/602* (2013.01); *G01B 11/2518* (2013.01); *G01S 17/89* (2013.01); *G06T 7/0004* (2013.01); *G06T 7/0081* (2013.01); *G06T 7/62* (2017.01); *G01B 2210/52* (2013.01); *G06T 2207/10012* (2013.01); *G06T 2207/30164* (2013.01)

(58) Field of Classification Search
CPC .............. G06T 7/62; G06T 7/0004; G06T 2207/30164; G01B 11/2522; G01B 2210/52; G01B 11/2504; G01B 11/22
See application file for complete search history.

(56) References Cited

U.S. PATENT DOCUMENTS

| | | | |
|---|---|---|---|
| 4,682,894 A | 7/1987 | Schmidt et al. | |
| 4,924,506 A | 5/1990 | Crossley et al. | |
| 5,028,799 A * | 7/1991 | Chen ...................... | G01B 11/24 250/559.23 |
| 5,184,733 A * | 2/1993 | Arnarson ............... | A22C 25/00 177/1 |
| 5,201,035 A | 4/1993 | Stytz et al. | |

(Continued)

*Primary Examiner* — Brian Werner
(74) *Attorney, Agent, or Firm* — Loginov IP (57) ABSTRACT

A system and method for determining volume of a runtime object with a vision system is provided. A plurality of vision sensors are arranged so that the fields of view (FOVs) of the plurality of vision sensors collectively view features associated with volume determination of a runtime object. Each of the displacement sensors generates range images from sequences of analyzed images, each producing a single row of the range image. An ignoring volume is subtracted from the measured range image based upon one or more dividing planes as they appear in the viewing/imaging perspective of each displacement sensor. Negative subtraction results are substantially nulled. The resulting representative range images are used to calculate the volume of a portion of the object, as sectioned by the diving planes. Each volume result is summed/added to derive the overall summed volume of the runtime object.

22 Claims, 10 Drawing Sheets

(56) References Cited

U.S. PATENT DOCUMENTS

| | | |
|---|---|---|
| 5,745,176 A | 4/1998 | Lebens |
| 5,837,892 A | 11/1998 | Cavallaro et al. |
| 6,064,759 A | 5/2000 | Buckley et al. |
| 6,173,070 B1 | 1/2001 | Michael et al. |
| 6,483,948 B1 | 11/2002 | Spink et al. |
| 7,004,904 B2 | 2/2006 | Chalana et al. |
| 7,310,431 B2 | 12/2007 | Gokturk et al. |
| 2005/0241862 A1* | 11/2005 | Liang ................. G01G 9/00 177/1 |
| 2005/0257748 A1* | 11/2005 | Kriesel ............... A01K 11/008 119/51.02 |
| 2006/0017720 A1 | 1/2006 | Li |
| 2008/0146932 A1 | 6/2008 | Chalana et al. |
| 2009/0231689 A1 | 9/2009 | Pittsyn et al. |
| 2010/0161232 A1 | 6/2010 | Chen et al. |
| 2010/0208035 A1 | 8/2010 | Pinault et al. |
| 2010/0277571 A1 | 11/2010 | Xu et al. |
| 2013/0201471 A1 | 8/2013 | Bui et al. |
| 2013/0223673 A1 | 8/2013 | Davis et al. |

\* cited by examiner

SYSTEM AND METHOD FOR DETERMINATION OF OBJECT VOLUME WITH MULTIPLE THREE-DIMENSIONAL SENSORS

RELATED APPLICATION

This application claims the benefit of U.S. Provisional Application Ser. No. 62/188,732, entitled SYSTEM AND METHOD FOR DETERMINATION OF OBJECT VOLUME WITH MULTIPLE THREE-DIMENSIONAL SENSORS, filed Jul. 5, 2015, the teaching of which are expressly incorporated herein by reference.

FIELD OF THE INVENTION

This invention relates to machine vision systems used in determining the volume of an imaged object surface using a three-dimensional (3D) sensor.

BACKGROUND OF THE INVENTION

In manufacturing and assembly processes, it is often desirable to analyze an object surface to determine the nature of features and/or irregularities. The displacement (or "profile") of the object surface can be determined using a machine vision system (also termed herein "vision system") in the form of a laser displacement sensor (also termed a laser beam "profiler"). A laser displacement sensor captures and determines the (three dimensional) profile of a scanned object surface using a planar curtain or "fan" of a laser beam at a particular plane transverse to the beam propagation path. In a conventional arrangement, a vision system camera assembly is oriented to view the plane of the beam from outside the plane. This arrangement captures the profile of the projected line (e.g. extending along the physical x-axis) on the object surface, which, due to the baseline (i.e. the relative spacing along the y-axis) between the beam (fan) plane and the camera causes the imaged line to appear as varying in the image y-axis direction as a function of the physical z-axis height of the imaged point (along the image x-axis). This deviation represents the profile of the surface. Laser displacement sensors are useful in a wide range of inspection and manufacturing operations where the user desires to measure and characterize surface details of a scanned object via triangulation. One form of laser displacement sensor uses a vision system camera having a lens assembly and image sensor (or "imager") that can be based upon a CCD or CMOS design. The imager defines a predetermined field of grayscale or color-sensing pixels on an image plane that receives focused light from an imaged scene through a lens.

In a typical arrangement, the displacement sensor(s) and object are in relative motion (usually in the physical y-coordinate direction) so that the object surface is scanned by the sensor(s), and a sequence of images are acquired of the laser line at desired spatial intervals—typically in association with an encoder or other motion measurement device (or, alternatively, at time based intervals). Each of these single profile lines is typically derived from a single acquired image. These lines collectively describe the surface of the imaged object and surrounding imaged scene and define a "range image" or "depth image".

Other camera assemblies can also be employed to capture a 3D image (range image) of an object in a scene. For example, structured light systems, stereo vision systems, DLP metrology, LIDAR-based systems, time-of-flight cameras, and other arrangements can be employed. These systems all generate an image that provides a height value (e.g. z-coordinate) to pixels.

A 3D range image generated by various types of camera assemblies (or combinations thereof) can be used to locate and determine the presence and location of points on the object surface. In certain vision system implementations, a plurality of displacement sensors (e.g. laser profilers) can be mounted together. In the example of a laser profiler, the object moves in relative motion with respect to the camera(s). This motion can be the basis of a common (motion) coordinate system for all displacement sensors.

Many vision systems implement a so-called volume tool. This tool is designed to translate the positional data of the object surfaces a quantitative measurement of object volume based on the imaged size of the object within the field of view (FOV). The size of the object is compared to a calibrated value for pixels in the FOV and this is used to determine various measurements (e.g. millimeters, cubic centimeters, etc.). By way of example, the volume tool returns a measurement for the object in cubic centimeters.

Figure 1:
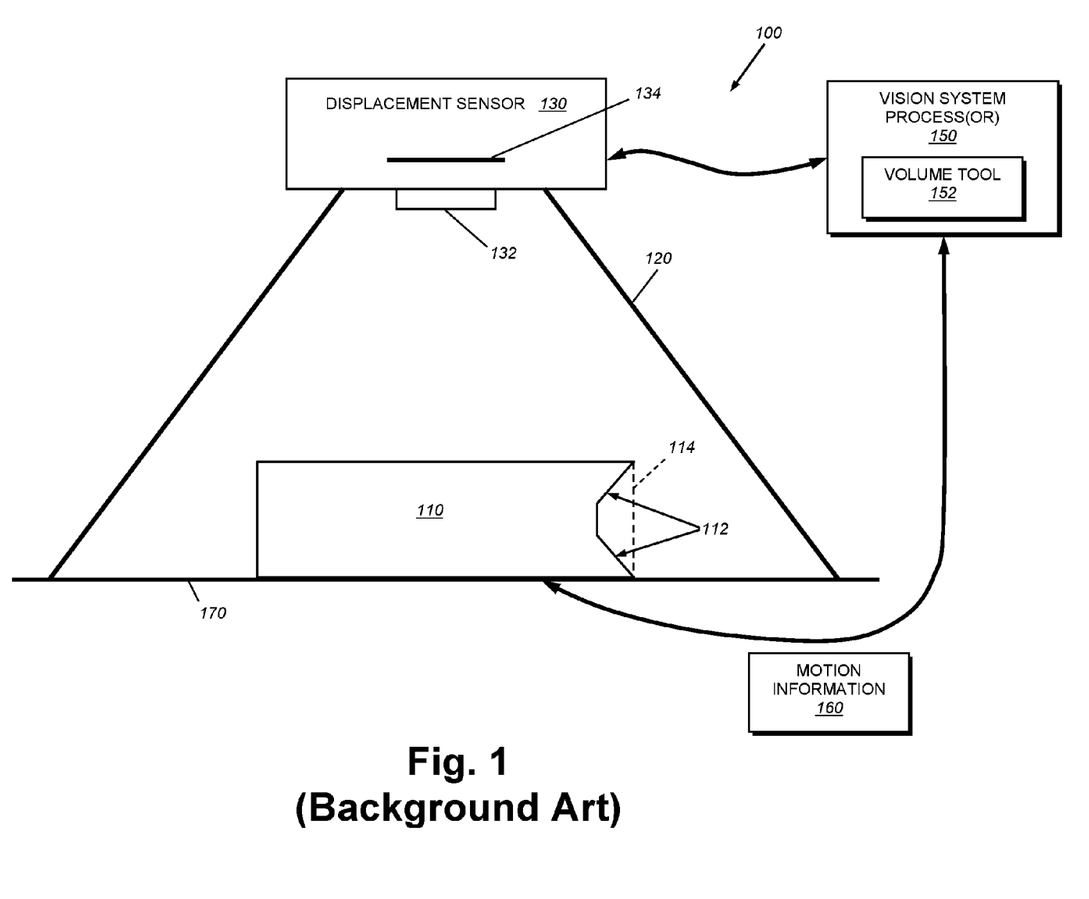
FIG. 1 is a diagram of a vision system with a single displacement sensor acquiring an image of an object with an undercut side, showing a potentially inaccurate volumetric measurement thereby.

A particular challenge is measuring the volume of an object that includes surfaces not readily visible or discernable to the to the displacement sensor. For example, where the object 110 contains an undercut surface 112 as shown in the vision system arrangement 100 FIG. 1, the laser fan 120 illuminates a line on the object 110 that is not visible to the displacement sensor's (130) optics 132 and imager 134 in the region of the undercut. Thus, any volumetric measurement (performed by the volume tool 152, which is part of the vision system process(or) 150 will be inaccurate, as it assumes that the undercut side is actually vertical (dashed line 114), or defines another shape that does not accurately reflect the real geometry of the object 110. Note that the object 110 in this example is supported on a conveyor and/or motion stage 170 that transmits motion information 160 (e.g. from an encoder or motion controller) to the vision system process(or) 150. Note also that the conveyor 170 and sensor 130 are in relative motion in a direction perpendicular to the page of the figure.

SUMMARY OF THE INVENTION

This invention overcomes disadvantages of the prior art by providing a system and method for determination of object volume that employs at least two displacement sensors arranged so that the fields of view (FOVs) of the displacement sensors collectively image the features needed/desired to accurately determine the volume of the object. Illustratively, a calibration object (e.g. a frustum) is used at training time to define planes in physical space in the views of the two or more displacement sensors. Respective synthetic range images are generated from the calibration object images, which represent the volumes in the area between those planes and the far field of the sensors' view—wherein each sensor has its own respective range image. During runtime, each displacement sensor acquires an actual, runtime range image of the runtime object. The synthetic (training) range image is subtracted from the runtime range image (and results below zero are clipped at zero—herein defined generally as a null value of relatively small number). This subtraction process generates a representative range image that defines a volume equal to the portion of the scanned sample only in the portion of physical space defined by the dividing planes. The volumes within the resulting range images are then computed by the volume tool of the vision system and the individual computed volumes are summed to determine the final total volume of the scanned object. This system and method thereby allows a volume measurement to be conducted on a runtime object that has (e.g.) side surfaces which cannot be imaged accurately in the view of a single sensor.

In an illustrative embodiment, a system and method for determining volume of a runtime object with a vision system is provided. A plurality of vision sensors are arranged so that the fields of view (FOVs) of the plurality of vision sensors collectively view all features associated with volume determination. The object can be mounted, and/or the displacement sensors can be arranged, to image surfaces of the object in a variety of ways (e.g. on a conveyor with displacement sensors mounted above, or suspended with sensors viewing down from above and viewing up from beneath). Each of the displacement sensors acquire a respective runtime image and derive therefrom a respective measured range image. An ignoring volume, which is generated based upon one or more dividing planes, is subtracted from the measured range image associated with each of the displacement sensors to derive a respective volume result for each of the displacement sensors. Negative subtraction results are clipped to zero and/or a similarly nulled or statistically non-included value. Each volume result is summed/added to derive the overall summed volume of the runtime object. At least one of the dividing planes can be established based upon a calibration process in which a range image is acquired by each of the displacement sensors and geometric features of a calibration object are used to define at least one of the dividing planes. Illustratively, the displacement sensors are laser displacement sensors and the operating surface and the displacement sensors are in relative motion with respect to each other. The motion information is transmitted to the displacement sensors related to the relative motion. The operating surface (which can be a conveyor) can define one of the dividing planes, which is established based upon a calibration process, in which a range image is acquired by each of the displacement sensors and geometric features of the operating surface are used to define the at least one of the dividing planes. Illustratively, at least one of the displacement sensors can be located to image a top side of the object and locating at least one of the vision sensors to image an opposing bottom side of the object, including providing a region with respect to the bottom side through which light passes. The dividing planes are oriented, and intersect, such that they divide the physical space into a predetermined number of partitions, wherein within any non-enclosed partition containing a portion of the runtime object a sensor positioned so that an entire surface of the object is visible to the sensor and partitions that are free of a portion of the runtime object are thereby free of coverage by (are not imaged by) one of the displacement sensors and contribute no value to the overall summed volume. Illustratively, the dividing planes can be oriented and intersect such that one or more enclosed partitions are created which lie entirely within the runtime object and the overall summed volume is calculated as a sum of the volumes calculated by the each of the displacement sensors and the volumes of the enclosed partitions are calculated geometrically. The overall summed volume or data representing a portion thereof can be transmitted to a utilization or monitoring device, such as a PC, server or programmable logic controller (PLC) for further handling/analysis. Illustratively, the monitoring or utilization system receives the overall summed volume (or another representation of the volume (e.g. on a scan-line-by-scan-line basis)) continually based on a specified scan distance (e.g. the y or motion direction). Alternatively, the monitoring or utilization system receives the overall summed volume based on a scan of the object by the plurality of displacement sensors that is mapped to a coordinate system with respect to geometry of the object. Thus, the monitoring or utilization system physically or virtually slices the object at a location relative to the coordinate system with respect to the geometry of the object. The scan distance in this embodiment can be based on at least one of physical distance, time and relative motion information between the runtime object and the displacement sensors. The monitoring or utilization system can illustratively receive the overall summed volume as successive volume measurements. The monitoring or utilization system can compare volume measurements based on the transmitted overall summed volume to predetermined expected values and can signal when a compared volume measurement is at least one of within, inside or outside a predetermined tolerance. The monitoring or utilization system can receive the overall summed volume continually based on a specified scan distance. The scan distance in this embodiment can also be based on at least one of physical distance, time and relative motion information between the runtime object and the displacement sensors. The received overall summed volume can thus provide an indication of a portion on the runtime object. The monitoring or utilization system thereby physically or virtually slices the object at a location relative to the portion.

BRIEF DESCRIPTION OF THE DRAWINGS

The invention description below refers to the accompanying drawings, of which.

DETAILED DESCRIPTION

Figure 2:
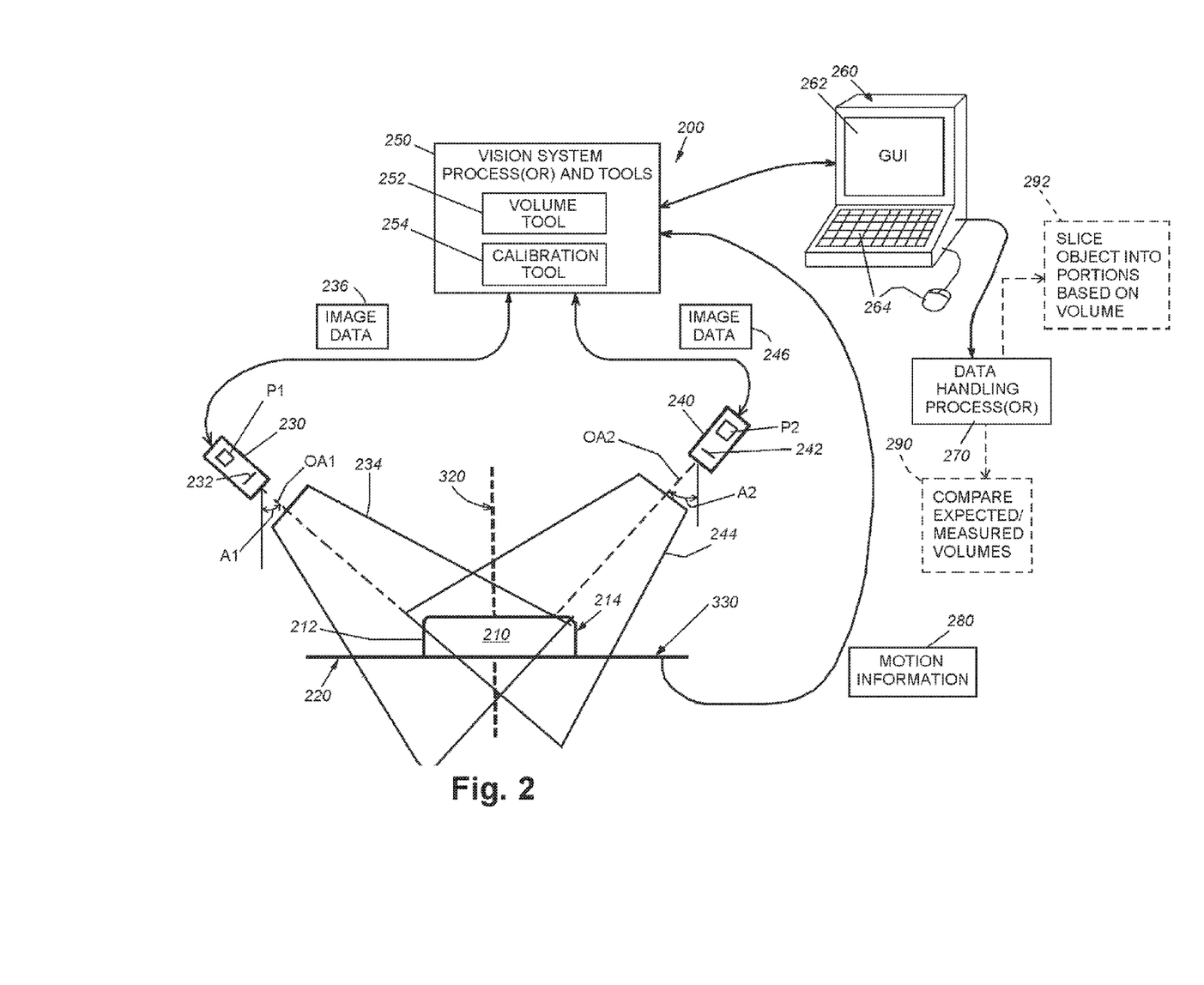
FIG. 2 is a frontal-view-oriented diagram of a vision system arrangement having a plurality (at least two) displacement sensors arranged to image all features on a runtime object that contribute to an accurate measurement of object volume.

FIG. 2 is a diagram of a vision system arrangement 200 shown acquiring an image of a runtime object 220 placed on a moving platform or conveyor 220 (an operating surface). A plurality (at least two) 3D sensors 230 and 240 are arranged to image the object 210 so that their respective optical axes OA1 and OA2 provide fields of view (FOVs) that effectively image all features (e.g. sides 212 and 214) that would otherwise fail to provide accurate volumetric information when imaged by a single displacement sensor's FOV. As described above, the 3D sensors utilized herein can be based upon a variety of technologies. By way of non-limiting example, the 3D sensors shown and described are laser displacement sensors (also termed, simply "displacement sensors"); however, this term can be used to describe a 3D sensor that is based upon any appropriate technology or technical principle of operation. The number of displacement sensors arranged to image the object is highly variable and is in part dependent upon the overall shape of the object and desired volumetric measurements. For example, where the object contains undercut features along its front, rear or bottom, sensors can be arranged to appropriately image such features. If all surfaces of a runtime object are not viewed/imaged by displacement sensors, then an assumption is made that the remaining (unviewed) surface is defined by (is coplanar to) the specified dividing planes (described below).

Figure 2A:
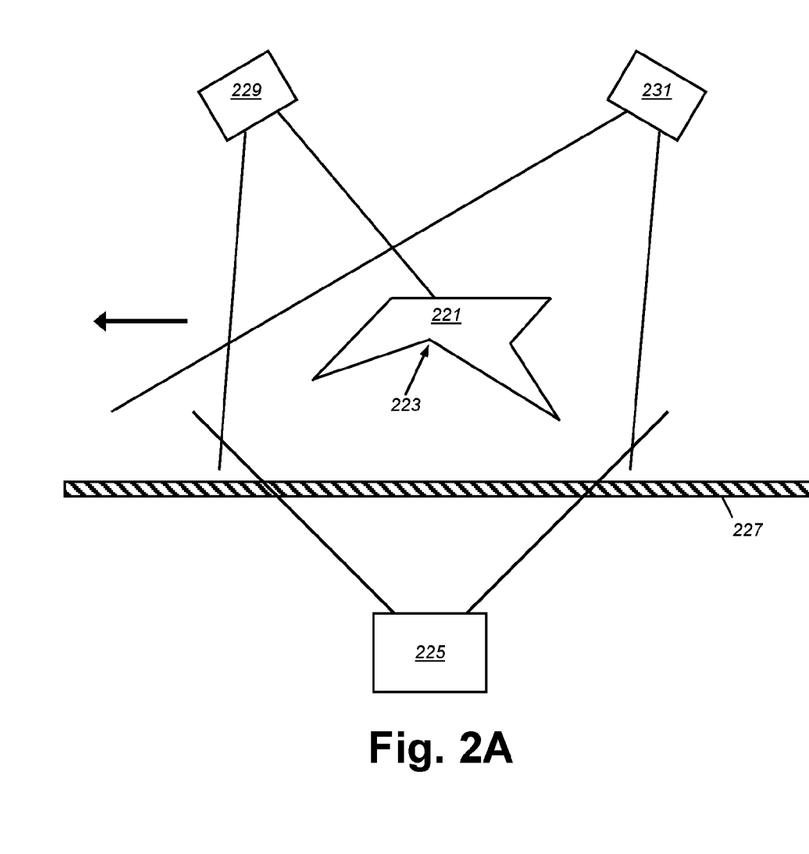
FIG. 2A is a frontal-view-oriented diagram of a vision system arrangement having a plurality of displacement sensors, including an upward-viewing sensor adapted to image the bottom of a runtime object.

Note that the displacement sensors in this embodiment are shown viewing down on the object from above as all features required for volume measurements can be ascertained from this point of view. However, in alternate embodiments, the object can be suspended or provided on a transparent platform/operating surface and at least one displacement sensors can view upwardly from below to image associated object features. Such an arrangement is shown in FIG. 2A, in which the object 221 includes a shape having an curved, or otherwise non-planar, bottom surface 223 that is effectively imaged by a third sensor 225, located so as to image the object 221 through a transparent platform or window 227. The third (upward-viewing) sensor can be employed when the bottom of the object, i.e. the portion of the surface not visible from the other cameras, is any shape other than a flat plane coincident with a dividing plane generated at calibration time. As shown, other sensors 229 and 231 can be located above the platform 227 to image top portions of the object 221. As described above, partitions can be established with respect to each sensor using the techniques provided herein. Note that a plurality of sensors can be arranged in the depicted upward-viewing arrangement to image the bottom side of an object 221 through the platform/window 227 in alternate embodiments. Likewise, the platform/window can be omitted where an object is suspended by other mechanisms.

Each displacement sensor 230, 240 includes a respective image sensor (imager) 232, 242 that generates pixel data from a line projected by a respective laser fan 234, 244 onto the surface of the object 210. The projected line is translated into a runtime range image with z-axis height values as the object moves (i.e. in a direction perpendicular to the plane of the figure page) based upon motion of the conveyor/motion stage 220. Image data 236 and 246 is transmitted, respectively from each imager 232, 242 to a vision system processor and associated process 250. Among other functional (software and hardware) components, the vision system process(or) 250 includes a volume tool 252 and a calibration tool or module 254. The vision system processor can be instantiated in whole or part in a general purpose or custom computing device 260 (e.g. a PC, laptop, server, tablet and/or smartphone) with an associated graphical user interface screen (GUI) 262 and data-entry device(s), such as a keyboard, mouse, touchscreen, etc. 264. In various embodiments some or all processing functions can be included in an onboard processor in one or more of the displacement sensors and the computing device can be interconnected for setup and data handling.

As shown, information an object volume can be passed to a downstream data-handling process(or) 270, which performs appropriate tasks, such as quality control, part rejection, part sorting, etc. This processor can be part of a generalized data utilization or monitoring system that can include a personal computer (PC), server, programmable logic controller (PLC), or other computing device that employs the data in an analysis or manufacturing process. The conveyor 220 provides motion information (e.g. encoder pulses) 280 as it moves so that the vision system process(or) 250 can correlate lines imaged by the displacement sensors 230, 240 with relative position along the motion (e.g. y-axis) direction. In various embodiments, the displacement sensor(s) can move relative to the object. In general, the term "relative motion" defines any such movement of the object and displacement sensor(s) with respect to each other. In various embodiments, motion information can be provided directly to an onboard processor P1, P2 within each displacement sensor 230, 240. As described further below, the conveyor surface can (but is not required to) define a discrete dividing plane for generation of synthetic (training) range images.

Figure 3:
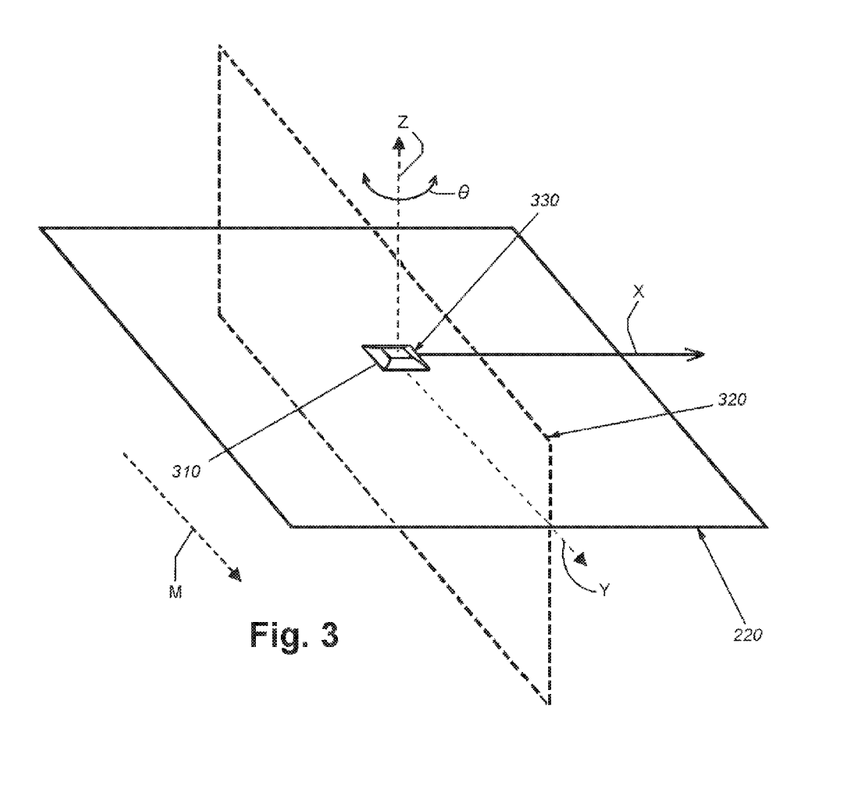
FIG. 3 is a diagram showing a dividing plane associated with a plane of symmetry of a calibration object (e.g. a frustum) and a second dividing plane associated with an operating surface (e.g. a conveyer belt) for generating a synthetic range image used to analyze volume of a runtime object as shown in FIG. 2.

With further reference to FIG. 3 the calibration of each displacement sensor is shown using a calibration object 310, which is defined by, or otherwise comprises, the shape of a frustum by way of non-limiting example. The calibration object 310 presents a series of surfaces and edges that vary in each of three degrees of freedom (e.g. along orthogonal axes x, y and z, plus rotation θ). The calibration object 310 is arranged by the user to define a desired dividing plane 320. A further dividing plane can be defined by the surface 330 of the conveyor 220 or other supporting platform on which the object 310 is placed. Alternatively, the (e.g. horizontal) dividing plane 330 can divide the features of the runtime object in a different manner than along a conveyor surface so that all object features needed for an accurate volume measurement are viewed—for example where the object contains features along its bottom, it can be suspended above a surface and an associated dividing plane (330) can be established remote from any supporting surface.

The (e.g. vertical) dividing plane 320 is located so that it provides an appropriate division between features on the object by which the selected displacement sensor completely views features that afford an accurate measurement of volume (i.e. the dividing plane 320 is defined during calibration so that the selected displacement sensor fully views features on the runtime object that are free of hidden undercuts and other obscuring characteristics that render a volumetric measurement problematic and/or inaccurate. Such hidden features are, conversely, viewed fully by a displacement sensor imaging the opposing side of the dividing planes 320 and 330. The calibrated dividing plane(s) is/are common to all displacement sensors in the vision system arrangement. In this manner no substantial overlap between sensors occurs and no omitted areas on the object occur. In this embodiment, the coordinate system (x, y, z, θ) is oriented with respect to the direction of conveyor/object scan motion M—with motion occurring along the y-axis. Note that in alternate embodiments, the object can be supported stationarily, while the camera assembly moves across the imaged scene. Alternatively, both the camera assembly and the object can remain stationary where the camera assembly is capable of generating range images free of relative motion between cameras and objects (e.g. stereo cameras). With reference again to FIG. 2, the dividing planes 320 and 330 from the calibration setup (FIG. 3) are depicted with respect to a runtime object. In this example, each displacement sensor 230, 240 images a discrete, opposing side of the object, separated by the vertical dividing plane 320 and separated from the conveyor/operating platform surface by the horizontal dividing plane 330. Note that the vertical and horizontal orientations of dividing planes are exemplary and any angle can be chosen to appropriately divide the space between discrete displacement sensors. The optical axis OA1 and OA2 of each displacement sensor 230, 240 is oriented at a non-vertical/non-horizontal angle A1, A2, respectively, relative to the vertical so that the object sides 212 and 214 are imaged fully by each camera, free of obscuration.

Note that, during calibration, the displacement sensors receive motion information 280 that allows the vision system process(or) 250 to correlate distance to pixels in the displacement sensor's FOV. As such each sensor can be calibrated to a coordinate system representing actual physical measurements. In this manner, the volumetric measurements of each displacement sensor (while independently derived) represent physical volume measures and added together into an overall volume measurement as described below. A variety of known calibration tools/modules and techniques can be used to define a coordinate system and scale for imaged pixels in each displacement sensor.

Figure 4:
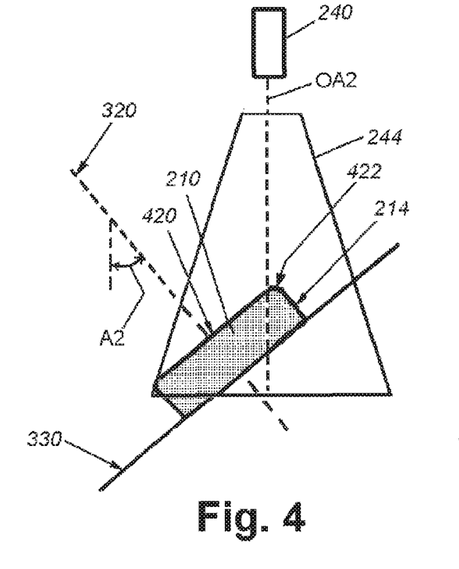
FIG. 4 is a diagram showing a view of a runtime object within the laser fan (the diverging, projected line of laser light that comprises a structured illumination in a displacement sensor) of an individual displacement sensor, including the calibrated dividing planes.
Figure 5:
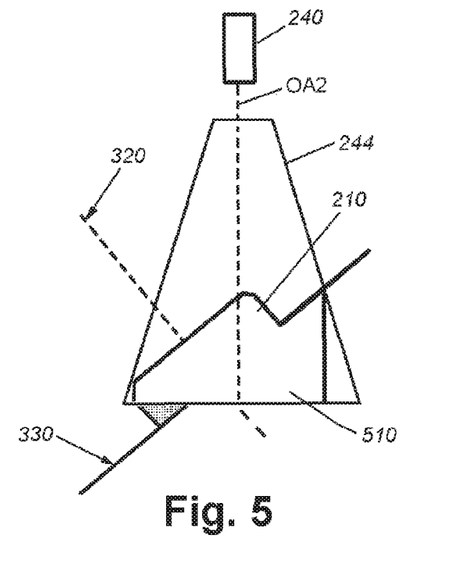
FIG. 5 is a diagram representing the measured ranges (distances from the bottom edge of the laser fan) from a single row of the range image, derived from a scan of the runtime object.
Figure 6:
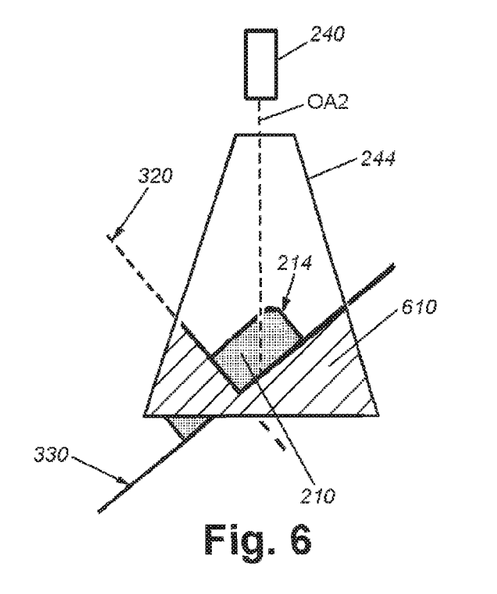
FIG. 6 is a diagram representing the measured ranges from a single row of the range image of the runtime object of FIG. 5, with the corresponding row of the synthetic range image (ignoring volume) superimposed, and in which a remaining portion of the measured ranges of runtime object is the representative volume within the region defined by the dividing planes used to generate that ignoring volume range image.

With reference now to FIGS. 4-6, the runtime object 210 is shown from the perspective of one of the two exemplary displacements sensors (e.g. displacement sensor 240), in which the optical axis OA2 is arranged at a non-vertical and non-perpendicular (i.e. acute) angle with respect to the vertical so as to fully image at least one of the object sides 214, that would be obscured if the sensor's optical axis were aligned vertically. In alternate arrangements, the depicted displacement sensor (or another displacement sensor) can be oriented with its optical axis horizontal, or at a position beneath the object (e.g. looking up at the object), to provide appropriate coverage to the imaged features on the object for the purpose of an accurate volumetric measurement. Appropriate dividing planes are defined at calibration time to accommodate the viewing angles and object geometry. As shown in FIG. 4, the object is imaged with the top surface 420, corner 422 and side 214 within the boundaries of the intersecting dividing planes 320 and 330.

FIG. 5 shows measured ranges (distances from the bottom edge of the laser fan) from a single exemplary row/line of the range image, derived from a scan of the runtime object 210. The measured volume 510 is computed from the runtime range image acquired by the displacement sensor 240. FIG. 6 shows the measured ranges from a single row of the range image of the runtime object of FIG. 5, with the corresponding row of the synthetic range image (ignoring volume) 610 superimposed. The remaining portion of the measured ranges of the runtime object is the representative volume within the region defined by the dividing planes used to generate that ignoring volume range image. The computation of range and volume is typically carried out by the vision system process(or) and associated modules/tools 252, 254.

Figure 7:
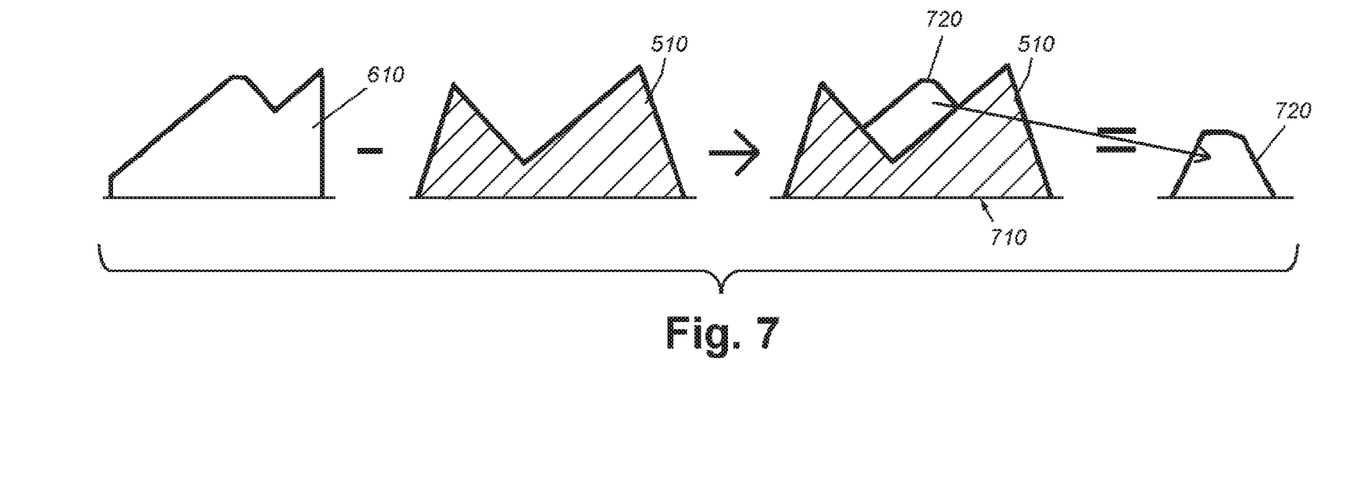
FIG. 7 is a diagrammatic representation of the process of deriving the volume within a single sensors region of space by subtracting the ignoring volume from the measured volume range image for the individual displacement sensor's respective side of the dividing plane and clipping any negative subtraction results to "zero", herein defined to include any nulling or statistically small or non-included value, as shown in FIGS. 4-6.

With reference to FIG. 7, for the displacement sensor 240, the process(or) 250 subtracts the ignoring volume 510 from the measured volume 610. The superimposition of the ignoring volume over the measured volume (shape 710) yields a final volume result 720. This result 720 is the volume on the displacement sensor's side of the dividing planes. This process is carried out for each displacement sensor and all volumes are added to obtain a final, accurate volume result for the object 210. Notably, any negative values resulting from the subtraction process for respective displacement sensors are clipped to zero and stored as such, ensuring that only positive volume measurements contribute to the overall volume result. Note that the term "zero" as used herein expressly includes any nulling value or statistically small value and/or value that is not included in the sum. For example, zeroing can involve flagging a negative volume so that it is not placed in the computation. The term "substantially nulled" shall also be used herein to define the process of non-including and/or making negative volume results insignificant to the desired volume result summation. Additionally, it is contemplated that the dividing planes can be oriented and intersect such that one or more enclosed partitions are created which lie entirely within the runtime object. The total volume of the runtime object is then calculated as the sum of the volumes calculated by the individual sensors and the volumes of the enclosed partitions calculated geometrically.

Figure 8:
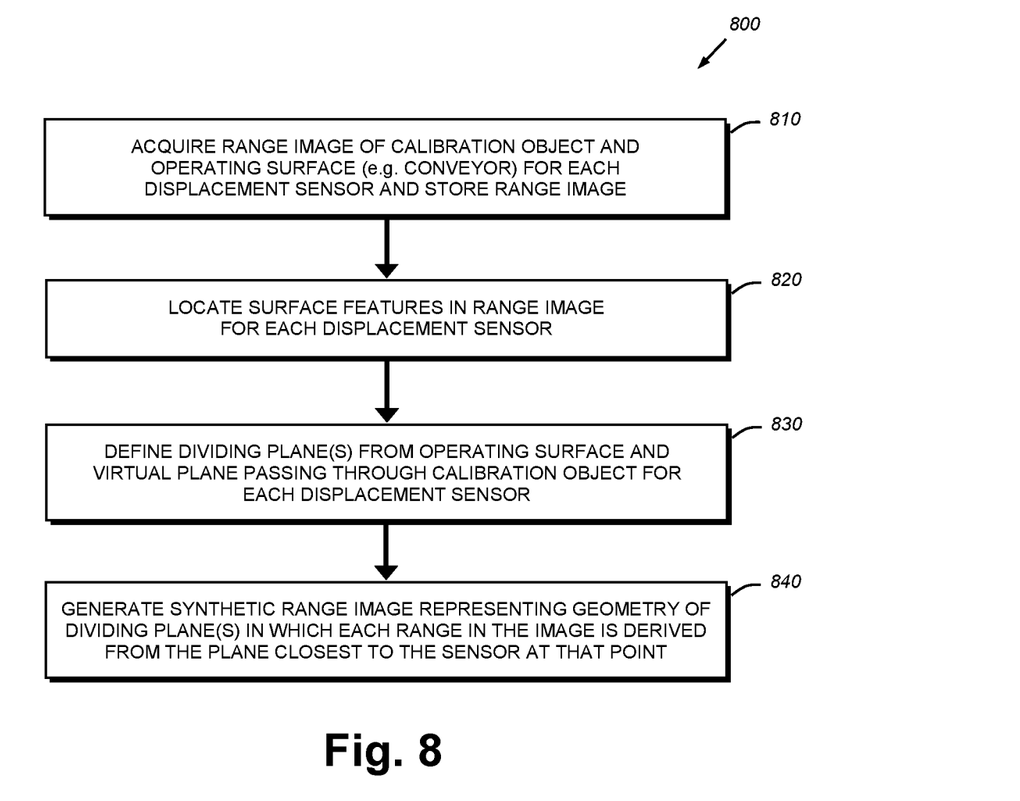
FIG. 8 is a flow diagram of a calibration process for each displacement sensor using a calibration object that defines dividing planes associated with each displacement sensor.
Figure 9:
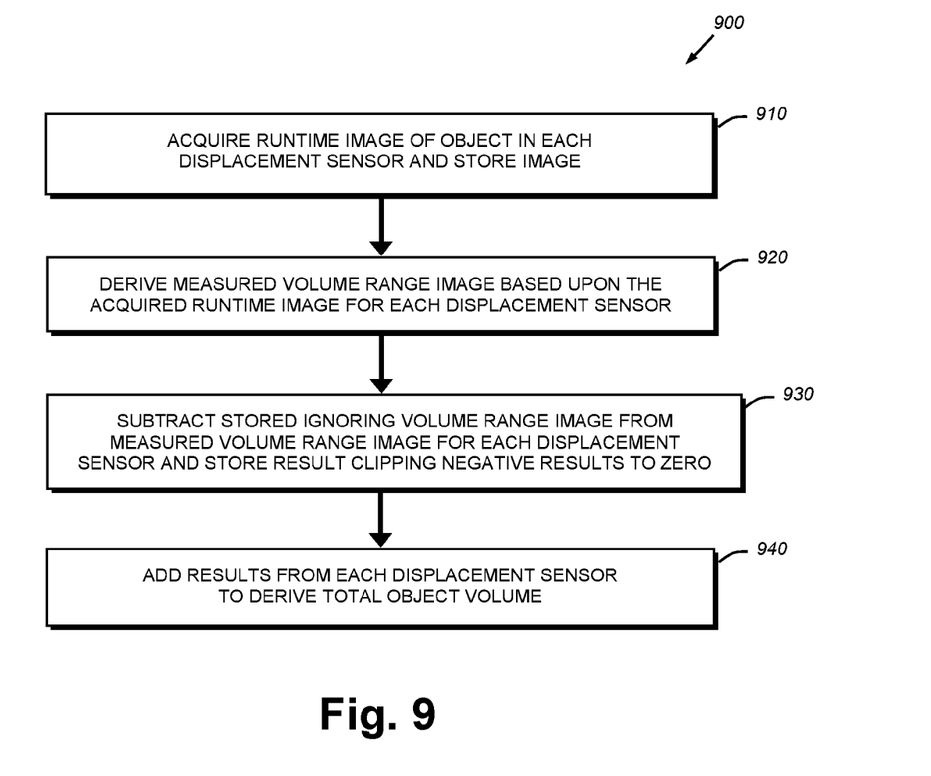
FIG. 9 is a flow diagram of a runtime volume determination process according to an illustrative embodiment.

The particular steps in the calibration process 800 and runtime volume determination process 900 are described in further detail in FIGS. 8 and 9, respectively. Referring to the calibration process 800 in FIG. 8, the process begins with the positioning of a calibration object, such as a frustum, on the conveyor or other base/platform (operating surface) within the field of view of each displacement sensor by the user. The displacement sensors each acquire a range image of the calibration object. These range images are stored or otherwise passed for further processing (step 810). In step 820, the surface features of the calibration object are located in each range image using manual techniques and/or automated search processes (e.g. edge finding, etc.). In step 830, the features are used to define the dividing planes. These planes typically include the operating surface (e.g. the conveyor) and a virtual plane passing through the calibration object. However, other dividing planes can be employed depending upon the geometry of the runtime object. Then, in step 840, a synthetic ignoring volume range image is generated that represents the geometry of the dividing planes. The range image is derived from the plane that is closest to the sensor within the column of physical space corresponding to a pixel within the range image. In this manner, the range image is associated with the desired half, quadrant, etc. of the overall object that includes all features to be included in the volume measurement, Having established dividing planes and an associated synthetic ignoring volume range image in the calibration process 800, the system can now determine volume of runtime objects in the runtime process 900 of FIG. 9. In step 910, each displacement sensor independently acquires images of the object from its own perspective and produces a range image calibrated to physical/real world measurements (e.g. a coordinate system and scale relative to the actual size of the object). This range data is stored or otherwise passed to the vision system process(or) 250 (step 920). In step 930, the ignoring volume range image generated in calibration process 800 for each displacement sensor is subtracted from the range image of step 920 to derive a range image representative of the volume in that displacement sensor's region as defined be the dividing planes for each displacement sensor. In step 940, the representative range image for each displacement sensor's, resulting from the subtraction process of step 930, is processed by the volume tool 252 to calculate the respective volume represented. In step 950, the represented volume results of each displacement sensor are summed to derive a total volume result for the object that is accurate and accounts for all features that can affect the accuracy of the volume measurement. Note that any negative volume results are illustratively clipped to zero in this summing process.

As described above, the imaged scene can include more than two displacement sensors (3D cameras). As shown in the exemplary arrangement 1000 of FIG. 10, four displacement sensors 1010, 1012, 1014 and 1016 are arranged around the exemplary runtime object 1020 on an operating surface/conveyor 1030 so as to fully acquire images of features that can affect accuracy of the volumetric measurement. The displacement sensors 1010, 1012, 1014, 1016 each communicate with one or more vision system processors 1060 and processes and associated functional tools/modules (e.g. calibration tool, volume tool, search tools, etc.) 1062. The process(or) 1060 receives motion information 1070 from (e.g.) the conveyor/operating surface 1030 (or moving camera assembly).

Figure 10:
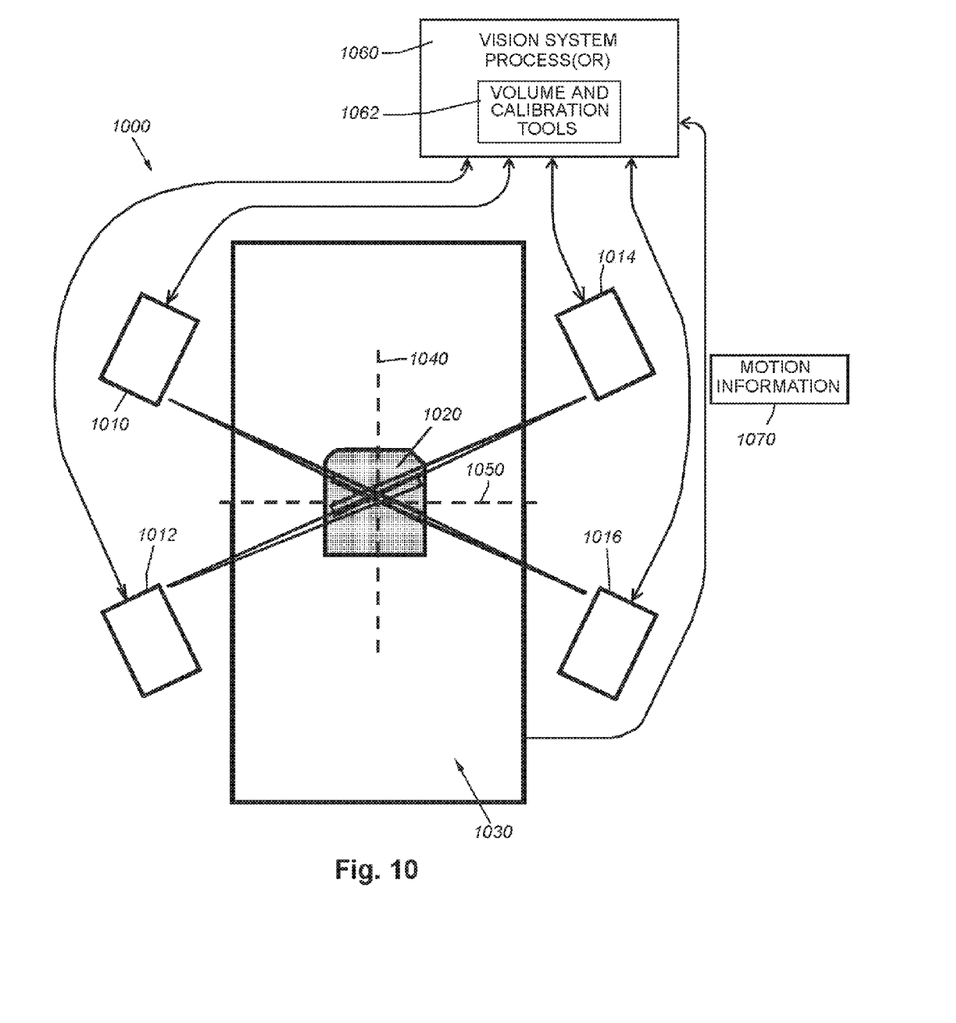
FIG. 10 is a top-view-oriented diagram showing the arrangement of four exemplary displacement sensors and associated dividing plane to fully image multiple sides/features on a complex-shaped runtime object.

Illustratively, the operating surface 1030 defines one dividing plane common to all displacement sensors 1010, 1012, 1014, 1016. The calibration process also defines a pair of intersecting dividing planes 1040 and 1050 that effectively divide the imaged object into four quadrants, each closest to a respective displacement sensor. In general all planes 1030, 1040, 1050 intersect so that the displacement sensors fully image the object, but volume results generated for each displacement sensor do not overlap one another (i.e. are free of overlap with each other). In operation, each displacement generates its synthetic ignoring volume range image from the three planes as they appear relative to its perspective. The volume result for that displacement sensor is, thus, the volume occurring only in that respective quadrant. All quadrant's volume results are summed together to obtain the overall volume result.

Further processes and functions provided by the system 200 can be directed toward a feedback associated with the output of volume measurements to the data handling process(or) 270. The system 200 can provide runtime feedback based on volume measurements. The system 200 can also compute continual volume measurements based on a specified y physical distance (and/or time, or encoder pulse counts in motion direction m) provided (e.g. by the motion information 280). The system 200 can also output successive volume measurements to a PLC, computer, or other monitoring/utilization system (e.g. process(or) 270). The system 200 can also compare (optional functional block 290, shown in phantom) volume measurements to predetermined expected values and signals when a volume measurement is inside or outside (and/or within) a predetermined tolerance of an expected value.

Illustratively, the system 200 can provide a y distance (or time, encoder pulse count, or some other positional indicator—e.g. motion information 280 in direction m) as an output when the calculated volume achieves a selected/predetermined value. This allows a secondary process (e.g. data handling process(or) 270) to indicate/know where to physically or virtually "slice" or "portion" the object being measured (optional functional block 292, shown in phantom). By way of example, after each "portion" is indicated, the system can "reset" so that it can generate multiple subsequent indications, each representing same/similar-sized subsequent portions. These portions can form the basis of actual physical and/or virtual slices, or can be used for other processes, such as marking gradations at each slice, etc.

Note that the monitoring or utilization system, as described herein, can receive the overall summed volume "continually" based on a specified scan distance. Bu "continually", it is meant that the data is collected on a line-scan-by-line-scan basis and contemporaneously transmitted to the system as it is collected. It is expressly contemplated that this term can include some amount of buffering of data and/or transmitting partial data (e.g. every other line), or groupings of lines, in a discrete transfer event.

Figure 11:
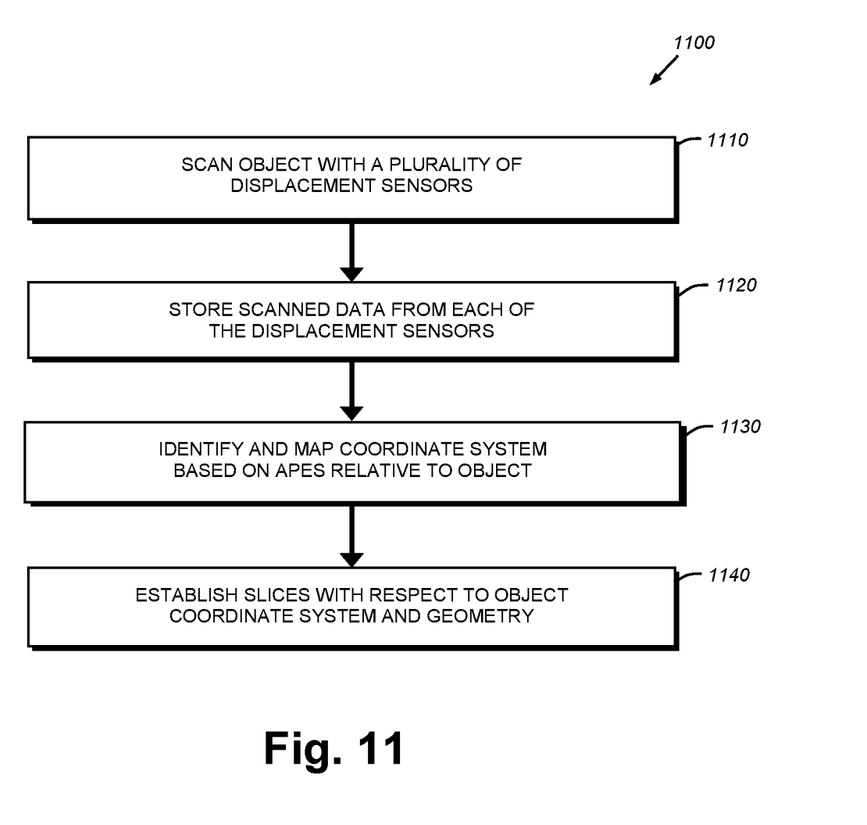
FIG. 11 is a flow diagram of a process for establishing dividing planes based upon established axes and coordinates of the object, according to an alternate embodiment.

While the illustrative embodiment shows the slice lines which separate the object into portions established based on a motion coordinate system and motion direction, it is expressly contemplated that other coordinate systems can be employed to establish appropriate slice positions. For example, a coordinate system can be established with respect to the inherent dimensions/geometry of the object, and used to establish object-related axes. More particularly, and with reference to the procedure 1100 of FIG. 11, the object can be scanned by the plurality of displacement sensors (step 1110) and the scan data can be stored (step 1120). The stored data is used by the vision system—for example caliper tools or blob tools—to establish relative axes that can be referenced to (e.g.) the leading edge of the object. That is, the slices can be based upon a longitudinal (long) axis of the object instead of the direction of motion of the object (step 1140). The object axes are used for portion measurement. This entails additional computational complexity and overhead to effectively resample the images in a coordinate system aligned with the desired slice orientation. Note that the dividing planes are used to combine the measurements from the multiple sensors to create a complete volume image. Once that image is formed, the vision tools (caliper tools, etc.) can be used to determine a direction axis for incrementally measuring portion volume and slicing perpendicular to that axis. The dividing planes generally remain the same at runtime, but the direction of the axis for portion measurement varies, based upon the object axis determination made by the vision tools.

It should be clear that the system and method for determining volume using two or more displacement sensors provides an accurate and reliable arrangement that avoids inaccuracies resulting from hidden object features, such as undercuts, sidewalls, and the like. In summary, and by way of non-limiting example, the system and method precisely calculates the volume of samples with undercut sides which would not be visible with a single displacement sensor. To facilitate this, a plurality of displacement sensors are each calibrated to define one or more dividing plane(s) in physical space, with each displacement sensor calculating the volume only within its portion (e.g. a half, a quadrant, etc.) of the overall physical space as defined by the dividing planes(s). These volumes are then summed by the vision system process(or) to determine the precise object volume. The calibration process (which can include appropriate "calibration" tools, functional modules, etc.) generates a synthetic "ignoring volume" range image for each displacement sensor, which is stored, and in normal operation only image subtraction is required before running a volume calculation. The range images from multiple displacement sensors can be processed in parallel on a single vision system. This process can be performed rapidly, thereby enabling high throughput of objects.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein the terms "process" and/or "processor" should be taken broadly to include a variety of electronic hardware and/or software based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate system, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system. Accordingly, this description is meant to be taken only by way of example, and not to otherwise limit the scope of this invention.

What is claimed is:

1. A method for determining volume of a runtime object with a vision system comprising the steps of:
    arranging a plurality of vision sensors so that fields of view (FOVs) of the plurality of vision sensors collectively view features associated with volume determination of the object;
    acquiring with each of the displacement sensors a respective runtime image and deriving therefrom a respective measured range image;
    subtracting an ignoring volume based upon one or more dividing planes associated with each of the displacement sensors from the respective measured range images, with negative subtraction results being substantially nulled, to derive a respective volume result for each of the displacement sensors; and
    adding each volume result to derive the overall summed volume of the runtime object.

2. The method as set forth in claim 1 wherein at least one of the dividing planes is established based upon a calibration process in which a range image is acquired by each of the displacement sensors and geometric features of a calibration object are used to define the at least one of the dividing planes.

3. The method as set forth in claim 2 wherein the displacement sensors are laser displacement sensors.

4. The method as set forth in claim 3 wherein the runtime object and the displacement sensors are in relative motion with respect to each other and motion information is transmitted to the displacement sensors related to the relative motion.

5. The method as set forth in claim 1 wherein the step of arranging includes locating at least one of the displacement sensors to image a top side of the object and locating at least one of the vision sensors to image an opposing bottom side of the object, including providing a region with respect to the bottom side through which light passes.

6. The method as set forth in claim 1 wherein the runtime object is located on a supporting operating surface that defines one of the dividing planes that is established based upon a calibration process in which a range image is acquired by each of the displacement sensors and geometric features of the operating surface are used to define the at least one of the dividing planes.

7. The method as set forth in claim 1 wherein the dividing planes are oriented, and intersect, such that they divide the physical space into a predetermined number of partitions, wherein within any non-enclosed partition containing a portion of the runtime object a sensor positioned so that a predetermined portion of a surface of the runtime object is visible to the sensor and partitions that are free of a portion of the runtime object are thereby free of coverage by one of the displacement sensors and contribute no value to the overall summed volume.

8. The method as set forth in claim 7 wherein the dividing planes are oriented and intersect such that one or more enclosed partitions are created which lie entirely within the runtime object and the overall summed volume is calculated as a sum of the volumes calculated by the each of the displacement sensors and geometrically calculated volumes of the enclosed partitions.

9. The method as set forth in claim 1 wherein the runtime object includes undercut surfaces not visible to the FOV of a single displacement sensor.

10. The method as set forth in claim 1 further comprising transmitting the overall summed volume to a monitoring or utilization system.

11. The method as set forth in claim 10 wherein the monitoring or utilization system receiving the overall summed volume continually based on a specified scan distance, the scan distance being based on at least one of physical distance, time and relative motion information between the runtime object and the displacement sensors.

12. The method as set forth in claim 10 wherein the monitoring or utilization system receives the overall summed volume as successive volume measurements.

13. The method as set forth in claim 10 wherein the monitoring or utilization system compares volume measurements based on the transmitted overall summed volume to predetermined expected values and signals when a compared volume measurement is at least one of within, inside or outside a predetermined tolerance.

14. The method as set forth in claim 10 wherein the monitoring or utilization system receives the overall summed volume continually based on a specified scan distance, the scan distance being based on at least one of physical distance, time and relative motion information between the runtime object and the displacement sensors, the received overall summed volume providing an indication of a portion on the runtime object.

15. The method as set forth in claim 14 wherein the monitoring or utilization system physically or virtually slices the object at a location relative to the portion.

16. The method as set forth in claim 10 wherein the monitoring or utilization system receives the overall summed volume based on a scan of the object by the plurality of displacement sensors that is mapped to a coordinate system with respect to geometry of the object.

17. The method as set forth in claim 16 wherein the monitoring or utilization system physically or virtually slices the object at a location relative to the coordinate system with respect to the geometry of the object.

18. A system for determining volume of a runtime object with a vision system comprising:

a plurality of vision sensors arranged so that fields of view (FOVs) of the plurality of vision sensors collectively view features associated with volume determination of the object and acquire a respective runtime image, used to derive therefrom a respective measured range image; and a vision processor that subtracts an ignoring volume based upon one or more dividing planes associated with each of the displacement sensors from the respective measured range images, with negative subtraction results being substantially nulled, to derive a respective volume result for each of the displacement sensors and that adds each volume result to derive the overall summed volume of the runtime object.

19. The system as set forth in claim 18 wherein at least one of the dividing planes is established based upon a calibration process in which a range image is acquired by each of the displacement sensors and geometric features of a calibration object are used to define the at least one of the dividing planes.

20. The system as set forth in claim 19 wherein the displacement sensors are laser displacement sensors.

21. The system as set forth in claim 18 wherein the runtime object is in relative motion with respect to the displacement sensors on an operating surface comprising a conveyor.

22. The system as set forth in claim 18 wherein the runtime object is located on a supporting operating surface that defines one of the dividing planes that is established based upon a calibration process in which a range image is acquired by each of the displacement sensors and geometric features of the operating surface are used to define the at least one of the dividing planes.

* * * * *